FLEXIBLE SUPERCONDUCTIVE LAMINATES

Filed June 23, 1967

Inventors:
Mark G. Benz;
Louis F. Coffin, Jr.,
by John M. Davis
Their Attorney.

United States Patent Office 3,537,827

Patented Nov. 3, 1970

3,537,827

FLEXIBLE SUPERCONDUCTIVE LAMINATES

Mark G. Benz, Burnt Hills, and Louis F. Coffin, Jr., Schenectady, N.Y., assignors to General Electric Company, a corporation of New York Filed June 23, 1967, Ser. No. 648,469
Int. Cl. B32b *15/00*
U.S. Cl. 29—194 3 Claims

ABSTRACT OF THE DISCLOSURE

An improved laminated superconductor is disclosed which comprises a superconductive layer bonded between a layer of a non-magnetic, non-superconductive material which has a high yield strength, a relatively high modulus of elasticity and a layer of a non-superconductive material which has a relatively low modulus of elasticity and a relatively low electrical resistance at the temperatures at which the superconductive layer is in the superconducting state. The conductor is more readily formed into coils because of the proportionate thicknesses of the non-superconductive layers than similar conductors.

Attention is drawn at this point to the copending application Ser. No. 506,686, filed on Nov. 8, 1965 in the same of Mark G. Benz, one of the present inventors, entitled "Superconductors and Process for Making Same" which relates to a laminated superconductor configuration which may be said to be "symmetrical," and to the copending application Ser. No. 543,173, filed on Apr. 18, 1966 in the name of Warren De Sorbo, now Pat. No. 3,416,917, entitled Superconductor Quaternary Alloys with High Current Capacities and High Critical Field Values which discloses a number of superconductive materials falling within the ambit of the present invention, both applications being assigned to the assignee of the present invention, the disclosures of which are both incorporated by reference herein.

This invention relates to superconductors and more particularly to superconductive bodies of laminated construction having an elongated tape or strip configuration with improved mechanical and physical properties.

It is now known that selected metals, either pure or preferably containing minor alloying additions, are capable of being reacted with other metals and forming superconductors of high current-carrying capacity. Specifically, the metals niobium, tantalum, technetium and vanadium can be reacted or alloyed with tin, aluminum, silicon or gallium to form superconducting compounds or alloys, such as $Nb_3Sn$, which have high current-carrying properties. Additionally, it is currently understood that these alloys or compounds can be improved by first alloying the basic or parent metal, i.e., niobium, tantalum, technetium or vanadium, with a minor amount of a solute metal having an atom diameter of at least 0.29 angstrom larger than the diameter of the present metal atom. A complete disclosure and description of various parent metals, solute metals and reactant metals can be found in the patent of Warren De Sorbo, previously referenced.

Of the many well-known materials exhibiting the superconductivity phenomenon at very low temperatures, i.e., generally temperatures below about 20° K., those having the most useful current carrying capacities and the highest critical field values are quite brittle by usual standards and present serious problems in the fabrication and handling of conductors made therefrom, particularly in the winding of coils. While in the development of the art, certain superconductive materials have become arbitrarily identified as "ductile," such as for example, niobium-zirconium, niobium-titanium and the like, and others such as the niobium-tin intermetallic compound $Nb_3Sn$ and other intermetallic compounds as "brittle," the distinction is one of a relatively minor degree. For example, the fracture ductility (per cent elongation at fracture) of the so-called "ductile" materials is of the order of 0.8 percent and for the "brittle" materials, of the order of 0.2 percent.

It has been found that niobium constitutes an extremely valuable parent metal due to the superior superconducting alloys which it will form. For example, small percentages generally greater than one-tenth weight percent of a solute metal can be added to the niobium parent metal to effectively increase its current-carrying capacity. Zirconium additions are felt to be those most advantageous. The solute materials, for example, zirconium, are added in amounts ranging from about 0.1 weight percent up to an amount equivalent to the ratio represented by the formula $Nb_2Zr$. The other additives are used in similar amounts. The solute-bearing niobium is reacted with either tin or aluminum by contacting the niobium with either of these metals and then heating them to an elevated temperature for a time sufficient to cause suitable reaction to occur. Especially advantageous materials are those of the niobium-tin compositions in which the ratio of niobium to tin approximates 3 to 1, i.e., $Nb_3Sn$, since these materials have superior superconducting properties. Consequently, this alloy has been fabricated in various forms, particularly wires and thin tapes, in efforts to produce devices such as high-field superconducting electromagnets. One of the best methods for obtaining superconducting wire or tape in a continuous and economical fashion is that wherein a wire or tape of a preselected parent metal, advantageously niobium or niobium alloy, is continuously lead through a bath of molten metal capable of combining with the parent metal and forming a superconducting alloy.

While these materials have possessed superior superconducting properties, and carry extremely high current densities, in forming them into devices such as electromagnetic coils it has been found that they are comparatively brittle mechanically and hence subject to cracking or fracture which ultimately results in loss of the device for its intended purpose. Additionally, when the current load imposed upon a superconducting coil exceeds the critical current density, $J_c$, the coil is driven into the normally resistive state and a large amount of heat is generated which must be quickly dissipated lest it destroy the electromagnetic coil.

As disclosed in greater detail in the previously referenced copending Benz application Serial Number 506,686, laminated superconductive tapes are disclosed comprising a superconductive inner laminate and outer laminae of non-superconductive metal which are flexible and capable of being wound into coils without damage to the brittle superconductive material. More particularly, a relatively thin tape of niobium foil is treated with tin whereby an adherent layer of $Nb_3Sn$ is formed on the surfaces of the foil, copper foils of substantially the same dimensions are then soft soldered to each of the major surfaces of the superconductive tape and preferably stainless steel tapes of the same dimensions are soft soldered to the exposed surfaces of the copper foils to form a symmetrically laminated structure. Tapes produced in this manner have a number of advantages. They are quite flexible and may be readily formed into coils. Because of the difference in the coefficients of thermal expansion of copper and the niobium-niobium tin material, the brittle intermetallic compound is placed in compression even at room temperature, minimizing the danger of mechanical fracture when coiling. The outer layers of stainless steel provide mechanical strength and corrosion resistance.

It would be desirable, however, to produce a laminated superconductive tape in which the number of laminae are reduced without sacrificing any of the desirable features set forth above and in which a copper surface is exposed to facilitate joining one length of tape to another by means of a soldered copper-to-copper joint. As will be apparent, the electrical characteristics of such a joint are significantly better than a stainless steel-to-stainless steel joint or a copper-to-stainless steel joint. It will thus be apparent that such a laminated structure should be equally coilable in either direction with respect to the plane of the superconductive layer.

It is therefore a principal object of this invention to provide a novel superconductive conductor which is flexible and can readily be wound into toroidal and solenoidal configurations.

It is another object of this invention to provide a novel tape-like superconductor of laminated construction in which a comparatively brittle or non-flexible superconductive material can readily be wound into coil form without fracturing the superconductive metal or alloy.

Another object of this invention is to provide a tape-like superconductor which is able to dissipate large amounts of heat when driven into the normally resistive state without the coil being damaged by the presence of the heat generated.

Other objects and advantages of this invention will be in part obvious and in part explained by reference to the accompanying specification and drawings.

Generally, the superconductive bodies of this invention comprise a laminated body including a superconductive inner laminate and outer laminates constructed of non-superconductive metals. These outer laminates have coefficients of thermal expansion greater than that of the superconductive inner laminate and are bonded integrally to each side of the inner laminate. With this construction, the inner laminate is in a state of mechanical compression which results from the fact that the outer laminates are in a state of mechanical tension.

The process is one wherein niobium or one of the parent metals is contacted with one of the reactant metals, such as tin in the case of niobium, and then heat treated in an atmosphere bearing a partial pressure of oxygen for a time to form the desired superconductive compound. This strip is then bonded integrally to two strips of metal which have a greater coefficient of thermal expansion than the superconductive material so that it is capable of resisting the stresses resulting from being wound into coil or other configuration. The integral bonding between the outer laminae and the inner superconductive laminate may be accomplished by appropriate means such as soldering.

In order to more clearly disclose the invention, the following description of a specific working example is made in conjunction with the accompanying drawings.

Figure 1:
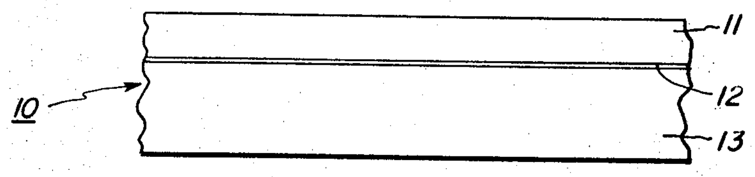
FIG. 1 is a schematic cross-sectional illustration of a laminated superconductor according to the present invention.

The preferred embodiment of this invention is illustrated in FIG. 1 wherein the laminated superconductor 10 is composed of a layer 11 of a non-superconductive metal or alloy which is characterized by having a relatively high modulus of elasticity, a relatively high yield strength and is non-magnetic. Such materials may be austenitic stainless steel or commercially available nickel- or cobalt-based alloys. Inner layer 12 comprises a relatively brittle layer of a superconductive material. Layer 13 is composed of a non-superconductive metal of high purity which has a finite but relatively low electrical resistance at operating temperatures which are of the order of 4.2° K. and which has a significantly lower modulus of elasticity and strength than layer 11. Such materials may be copper, aluminum, silver, gold or the platinum group metals. The layers are secured together by any suitable means such as, for example, soldering or brazing or the like, depending upon the choice of materials. A particularly advantageous combination of materials is AISI Type 304 stainless steel for layer 11, $Nb_3Sn$ for layer 12 and copper for layer 13. These materials may be laminated together by conventional lead-tin solder. It will be seen that layer 13 is somewhat greater in thickness than layer 11, an important feature which will be discussed in detail later.

Figure 2:
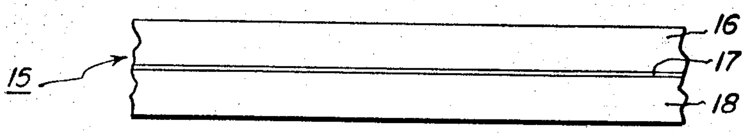
FIG. 2 is a schematic cross-sectional illustration of a different laminated superconductor used for comparison purposes.

In FIG. 2, a laminated superconductor 15 is illustrated which is composed of layers 16, 17 and 18, these layers corresponding to layers 11, 12 and 13 of FIG. 1 except that layers 16 and 18 are of substantially identical thicknesses. The structure illustrated in FIG. 2 forms no part of the invention and is included only for purposes of comparison.

In particular, a superconductive laminated tape structure was manufactured according to the construction of FIG. 1 wherein the layer 11 was formed from a Type 304 stainless steel tape about 0.001 inch in thickness in the hard condition and having a yield strength in excess of 100,000 p.s.i. Layer 12 was composed of a $Nb_3Sn$ superconductor formed by the diffusion reaction of a tin coating on a niobium tape in a known manner. This layer was about 0.0008 inch in thickness and had a minimum critical current of 300 amperes in a 100 kilogauss transverse field. Layer 13 was composed of a copper tape in the soft condition which was about 0.002 inch in thickness. The several layers were secured together with eutectic lead-tin solder and the total thickness of the laminated structure was about 0.0047 inch. This conductor was then slit to a width of about 0.500 inch.

A laminated superconductor was made from the same materials as set forth in the immediately preceding example except that the soft copper layer 18 was only 0.001 inch in thickness, in accordance with the structure illustrated in FIG. 2.

Figure 3:
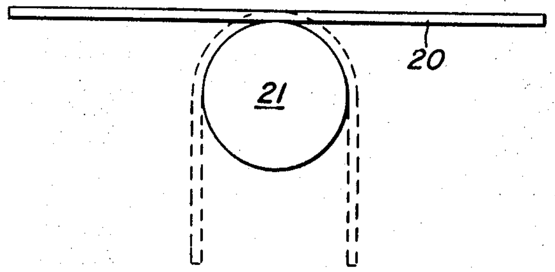
FIG. 3 is a schematic illustration of a test procedure.

In order to compare the ability of the structures illustrated in FIGS. 1 and 2 to be coiled, the following test procedure was employed. A number of conductor specimens of both configurations were prepared, as previously described in connection with FIGS. 1 and 2, care being taken not to bend or kink them. The critical current of these specimens, i.e., the current at which the superconductive property starts to decay toward normal resistivity while maintaining the conductor at 4.2° K. in a transverse field of 50 kilogauss, was determined before the specimens were bent, this value being equated to 100 percent. Each specimen was then subjected to a one cycle bending treatment, as schematically illustrated in FIG. 3, wherein a straight specimen 20 was placed against the periphery of a cylindrical mandrel 21 and bent into the position indicated by the broken lines around 180° of the mandrel. The specimens were then straightened and the critical current again determined. Mandrels of several different diameters were used and any change in the critical current was plotted in terms of percent change versus mandrel diameter in inches, as shown in FIG. 4 and FIG. 5.

Figure 4:
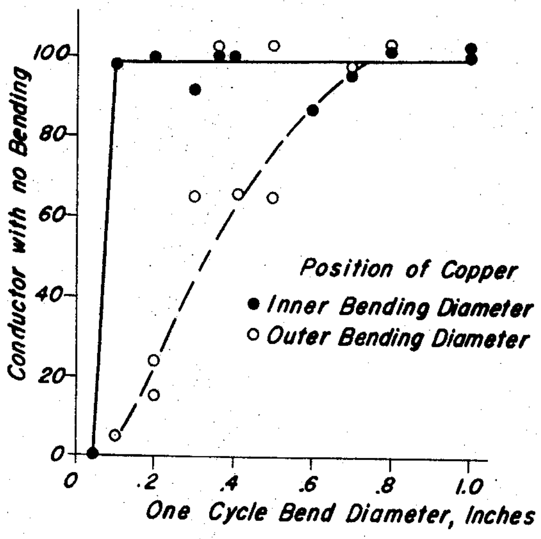
FIG. 4 is a graphical representation of certain electrical properties of the structure of FIG. 2.

The data plotted in FIG. 4 resulted from applying the one cycle bend test to a plurality of specimens made according to FIG. 2, some of which were bent around mandrels of varying diameters with the copper layer being adjacent the mandrel surface and represented by the solid dots, while the open circle points are the results when the stainless steel layer was next to the mandrel. It will be seen that when the structure of FIG. 2 is bent with the stainless steel layer on the outer radius of the bend, as shown by the solid line in FIG. 4, these specimens could be bent about a diameter of between about 0.1 to 0.2 inch without significant damage; however, when similar specimens were bent in reverse direction, i.e., with the copper on the outer radius of the bend, damage to the superconductor began to occur at diameters of about 0.8 inch, as indicated by the dashed line curve.

Figure 5:
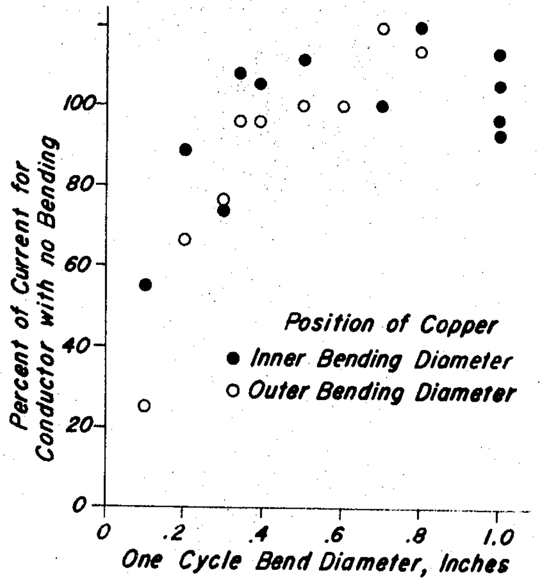
FIG. 5 is similar to FIG. 4 except illustrative of the properties of FIG. 1.

When specimens of conductors having the configuration of FIG. 1, namely where the copper layer 13 was twice the thickness of the stainless steel layer 11, were subjected to the same test procedure, the data plotted in FIG. 5 shows no real difference in the direction in which the specimens were bent and that this configuration produced a conductor which was capable of being bent about a 0.4 inch diameter with no significant damage. No attempt has been made to draw curves for the two bending directions in FIG. 5 because of scatter band of the data, but it will be apparent that there is no significant difference between the data represented by the solid dots and open circles.

It will thus be apparent that a laminated superconductor having a configuration as illustrated in FIG. 1 is much less likely to be damaged in handling by inadvertently bending in the wrong direction than is one having the configuration of FIG. 2. Furthermore, as previously pointed out, lengths of superconductive tapes to be formed into coils may have their ends joined by copper-to-copper joints even when the radius of the coil is quite small.

While the specific embodiment of the FIG. 1 configuration set forth for purposes of a complete disclosure had a 2:1 thickness ratio as between the copper and the stainless steel, the ratio of thickness of these layers is inversely proportional to the moduli of elasticity of the respective materials.

While for purposes of this disclosure a specific example and method of forming a superconductor has been disclosed, many variations falling within the ambit of the invention will readily occur to those skilled in the art.

For example, the superconductive layer may be formed by the simultaneous vapor deposition of the metals upon a stainless steel tape, or by the simultaneous reduction of appropriate metal halide gases by hydrogen to form the layer. Other and specifically different departures are obviously also possible. It is therefore not intended to limit the scope of the invention in any way except as defined by the appended claims.

What we claim as new and desire to secure by Letters Patent of the United States is:

1. A laminated electrical conductor comprising a superconductive layer comprising brittle $Nb_3Sn$ intermetallic compound which is bonded betweeen two layers of nonmagnetic, non-superconductive, electrically conductive, ductile metallic materials, the first of said two layers consisting of austenitic stainless steel and the second of said two layers being selected from the group consisting of copper and aluminum, the relative thicknesses of each of said first and second layers being inversely proportional to their respective moduli of elasticity.

2. The electrical conductor set forth in claim 1 wherein said second layer is composed of copper.

3. The electrical conductor set forth in claim 1 wherein said second layer is composed of aluminum.

References Cited

UNITED STATES PATENTS

| | | | |
|---|---|---|---|
| 3,233,154 | 2/1966 | Hnilcka | 29—198 |
| 3,309,179 | 3/1967 | Fairbanks | 29—198 |
| 3,395,000 | 7/1968 | Hanak | 29—198 |
| 3,397,084 | 8/1968 | Krieglstein | 29—194 |
| 3,421,207 | 1/1969 | Berghout | 29—194 |

HYLAND BIZOT, Primary Examiner

U.S. Cl. X.R.

29—196.1, 199